US 8,113,184 B2

(12) United States Patent
Seiyama et al.

(10) Patent No.: US 8,113,184 B2
(45) Date of Patent: Feb. 14, 2012

(54) EGR VALVE DEVICE

(75) Inventors: Hideyuki Seiyama, Oyama (JP); Tadashi Iijima, Yuki (JP); Shuuji Hori, Oyama (JP); Daisuke Kozuka, Oyama (JP); Taisei Okubo, Tsukuba (JP)

(73) Assignee: Komatsu Ltd., Tokyo (JP)

( * ) Notice: Subject to any disclaimer, the term of this patent is extended or adjusted under 35 U.S.C. 154(b) by 301 days.

(21) Appl. No.: 12/521,343

(22) PCT Filed: Dec. 26, 2007

(86) PCT No.: PCT/JP2007/074926
§ 371 (c)(1),
(2), (4) Date: Jun. 26, 2009

(87) PCT Pub. No.: WO2008/081803
PCT Pub. Date: Jul. 10, 2008

(65) Prior Publication Data
US 2010/0319662 A1    Dec. 23, 2010

(30) Foreign Application Priority Data

Dec. 28, 2006    (JP) .................................. 2006-355917

(51) Int. Cl.
*F02M 25/07* (2006.01)
*F02B 47/08* (2006.01)
(52) U.S. Cl. ............................. 123/568.12; 123/568.26
(58) Field of Classification Search ............. 123/568.12, 123/568.26
See application file for complete search history.

(56) References Cited

U.S. PATENT DOCUMENTS

| 4,020,809 | A | 5/1977 | Kern et al. |
| 4,548,184 | A | 10/1985 | Laufer et al. |
| 4,907,492 | A | 3/1990 | Hampejs |
| 5,253,619 | A * | 10/1993 | Richeson et al. .......... 123/90.12 |
| 5,415,603 | A | 5/1995 | Tuzuki et al. |
| 6,347,620 | B1 * | 2/2002 | Miyake .................... 123/568.29 |
| 6,422,217 | B1 * | 7/2002 | Feucht et al. ............ 123/568.11 |
| 7,455,056 | B2 * | 11/2008 | Seiyama et al. ......... 123/568.11 |
| 2002/0066441 | A1* | 6/2002 | Tyler .......................... 123/568.2 |
| 2005/0028797 | A1* | 2/2005 | Janssen et al. ........... 123/568.26 |
| 2007/0194260 | A1 | 8/2007 | Seiyama et al. |

FOREIGN PATENT DOCUMENTS

| DE | 3135234 A1 | 3/1983 |
| EP | 0296104 A1 | 12/1988 |
| EP | 1 207 330 A2 | 5/2002 |

(Continued)

OTHER PUBLICATIONS

English translation of International Preliminary Report on Patentability, Chapter I of the Patent Cooperation Treaty and PCT Written Opinion of the International Searching Authority for PCT/JP2007/074926 (7 pages).

(Continued)

*Primary Examiner* — Erick Solis
(74) *Attorney, Agent, or Firm* — Holtz, Holtz, Goodman & Chick, PC

(57) ABSTRACT

An EGR valve device includes a valve housing of which inside exhaust gas passes through, a poppet valve as a valve body accommodated in the valve housing, and a hydraulic servo actuator for driving the poppet valve to be opened and closed. The hydraulic servo actuator is provided by a three-port or four-port servo valve.

10 Claims, 9 Drawing Sheets

FOREIGN PATENT DOCUMENTS

| | | |
|---|---|---|
| JP | 49-72899 | 10/1947 |
| JP | 2-150480 U | 12/1990 |
| JP | 5-330348 A | 12/1993 |
| JP | 7-332169 A | 12/1995 |
| JP | 10-159663 A | 6/1998 |
| JP | 11-107821 A | 4/1999 |
| JP | 2001-82257 A | 3/2001 |
| WO | WO 2005/095834 A1 | 10/2005 |

OTHER PUBLICATIONS

Chinese Office Action dated Sep. 21, 2010 (and English translation thereof) in counterpart Chinese Application No. 200780048868.7.

Extended European Search Report (EESR) dated Jul. 19, 2011 (in English) in counterpart European Application No. 07860155.6.

* cited by examiner

EGR VALVE DEVICE

This application is a U.S. National Phase Application under 35 USC 371 of International Application PCT/JP2007/074926 filed DECEMBER 26, 2007.

TECHNICAL FIELD

The present invention relates to an EGR (Exhaust Gas Recirculation) valve device, and more particularly to improvements of an actuator that operates an EGR valve.

BACKGROUND ART

EGR has been typically known as a technique to reduce nitrogen oxides (NOx) contained in exhaust gas of a diesel engine. In EGR, a part of the exhaust gas of the engine is returned to an intake pipe from an exhaust pipe through an EGR pipe. At this time, an EGR valve device is provided on the EGR pipe or on a branch portion of the exhaust pipe and the EGR pipe. By controlling a valve body included in the EGR valve device to open and close the valve body in accordance with an operating condition of the engine, a proper amount of the exhaust gas is returned to the intake pipe at a proper timing.

The valve body of the EGR valve device is biased toward a closing side by a valve spring. A base end of the valve body is connected to a hydraulic piston. Accordingly, when the valve body is opened, the hydraulic piston is moved by hydraulic pressure against biasing force of the valve spring, pressure of exhaust gas, or hydrodynamic force of exhaust gas to lift the valve body (see Patent Document 1) By balancing the hydraulic pressure with the biasing force and the pressure and hydrodynamic force of the exhaust gas, the opening degree of the valve body is maintained.

Patent Document 1: International Publication No. 05/095834

DISCLOSURE OF THE INVENTION

Problems to be Solved by the Invention

However, in a traditional EGR valve device, the hydraulic pressure to thrust the valve body is balanced with reactive force on the side of the valve body (the biasing force of the valve spring, the pressure of the exhaust gas, and the hydrodynamic force of the exhaust gas). Accordingly, when the pressure or hydrodynamic force of the exhaust gas is frequently changed due to exhaust pulse, the hydraulic pressure cannot instantly correspond to the change, whereby hunting is occurred in the valve body. Thus, it becomes difficult to maintain a constant opening degree of the valve body. Especially, when a lift amount of the valve body is reduced to keep a relatively small opening degree, changes in the opening degree brought by the hunting, i.e., changes in the flow volume of the exhaust gas, becomes noticeable.

In recent years, it has been desired to raise an EGR rate because regulations on exhaust gas have been increasingly tightened. Thus, a valve body tends to be enlarged to recirculate a larger amount of exhaust gas. On the other hand, there has been a demand for reduction of nitrogen oxides in a low-load area and a low-revolution area of an engine, so that reduction of a flow volume of exhaust gas has been desired to be controlled while maintaining a small opening degree of the valve body. However, when the valve body is enlarged, the valve body may be affected more easily by the change of pressure or hydrodynamic force of exhaust gas. Thus, it becomes more difficult to maintain the small opening degree of the valve body, so that the flow volume of the exhaust gas cannot be precisely controlled.

An object of the present invention is to provide an EGR valve device capable of precisely controlling a flow volume of exhaust gas while maintaining a small opening degree of a valve body.

Means for Solving the Problems

An EGR valve device according to an aspect of the invention includes: a valve housing of which inside exhaust gas passes through; a valve body accommodated in the valve housing; and a hydraulic servo actuator that drives the valve body to be opened and closed.

According to the aspect of the invention, since the valve body is driven by the hydraulic servo actuator, the valve body can be maintained by such a large amount of oil pressure that is not affected by the pressure and hydrodynamic force of the exhaust gas which are changeable due to exhaust pulse in order to keep a small open degree of the valve body, thereby precisely controlling a flow volume of the exhaust gas.

In the EGR valve device according to the aspect of the invention, it is preferable that the hydraulic servo actuator include: a housing; a servo piston slidably accommodated in the housing; and a pilot spool accommodated in a center hole of the servo piston to slide by a pilot pressure, a hydraulic chamber into which pressure oil is delivered is provided on one end of the servo piston in the housing. It is also preferable that the servo piston is provided with: a pressure port for delivering the pressure oil from the outside into the center hole; a piston port for intercommunicating the center hole and the hydraulic chamber; and a return port for discharging the pressure oil in the hydraulic chamber to the outside, the pilot spool is provided with a switching means for switching a communication state of the respective ports, and the valve body is driven to be opened and closed in conjunction with a movement of the servo piston.

With the above arrangement, the servo piston preferably includes a large-diameter portion and a small-diameter portion on which oil pressure in the pressure port are applied and moves toward the one end of the servo piston by a difference in a pressure receiving area between the large-diameter portion and the small-diameter portion.

According to the aspect of the invention, the hydraulic servo actuator is provided by a three-port servo valve. Thus, the housing can be reduced in size, so that the hydraulic servo actuator can be downsized.

With the above arrangement, the servo piston is moved toward one side by the difference between the pressure receiving areas. Thus, when the servo piston is moved to close the valve body, for instance, a biasing unit such as a spring is not required, thereby contributing to downsizing.

In the EGR valve device according to the aspect of the invention it is preferable that the hydraulic servo actuator include: a housing; a servo piston slidably accommodated in the housing; and a pilot spool accommodated in a center hole of the servo piston to slide by a pilot pressure, a first hydraulic chamber and a second hydraulic chamber into which pressure oil is delivered are provided at the one end and the other end of the servo piston, respectively. It is also preferable that the servo piston is provided with: a pressure port for delivering the pressure oil from the outside into the center hole; a first piston port for intercommunicating the center hole and the first hydraulic chamber; a second piston port for intercommunicating the center hole and the second hydraulic chamber; and a return port for discharging the pressure oil in the hydraulic chamber to the outside, individually, the pilot spool is provided with a switching means for switching a communicating state of the respective ports, and the valve body is driven to be opened and closed in conjunction with a movement of the servo piston.

With this arrangement, the hydraulic servo actuator is provided by a four-port servo valve. Thus both when the servo piston is moved to open the valve body and when the servo piston is moved to close the valve body, the servo piston can constantly resist against the valve body with high oil pressure, so that the valve body can be opened and closed without being affected by the exhaust pulse of exhaust gas.

In the EGR valve device according to the aspect of the invention, the valve body may be a poppet valve or a butterfly valve.

In the EGR valve device according to the aspect of the invention, the valve housing may be provided with an inflow section into which a cooling medium is delivered.

In the above arrangement, the cooling medium may be oil used in the hydraulic servo device.

Since the poppet valve or butterfly valve, which has been relatively well known, is used as the valve body, a complicated structure can be avoided, thereby leading to good assembly efficiency.

According to the aspect of the invention, when the valve body is the butterfly valve, the inflow section for the cooling medium is provided in the vicinity of the drive shaft within the valve housing, thereby efficiently cooling the vicinity of the drive shaft. Therefore, durability of an O-ring held between the drive shaft and the valve housing can be reliably enhanced, thereby maintaining good sealability.

Since the oil used in the hydraulic servo actuator is used as the cooling medium, the cooling medium for cooling the vicinity of the drive shaft is not independently required. Further, a structure for delivering such a dedicated cooling medium between the inside and outside of the EGR valve device is not required, thereby downsizing the EGR valve device as a whole.

In the EGR valve device according to the aspect of the invention, the EGR valve device may be used at an EGR rate of 15% or more.

According to the aspect of the invention, a higher EGR rate can be attained as compared with a traditional EGR rate and emission of nitrogen oxides can be reliably reduced.

BEST MODE FOR CARRYING OUT THE INVENTION

First Exemplary Embodiment

A first exemplary embodiment of the invention will be described below with reference to the accompanying drawings.

Figure 1:
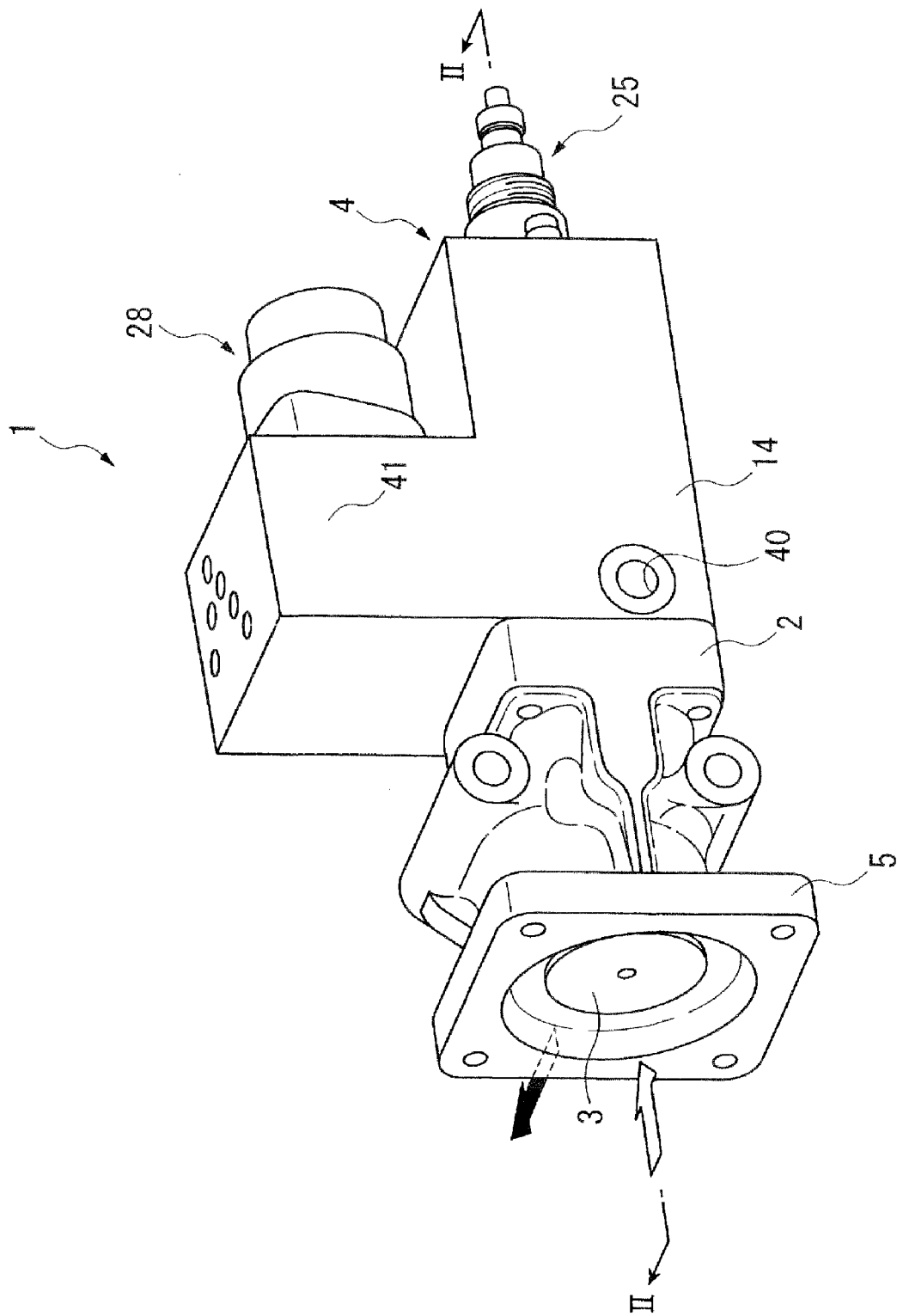
FIG. 1 is an overall perspective view showing an EGR valve in which a valve body is closed according to a first exemplary embodiment of the invention.
Figure 2:
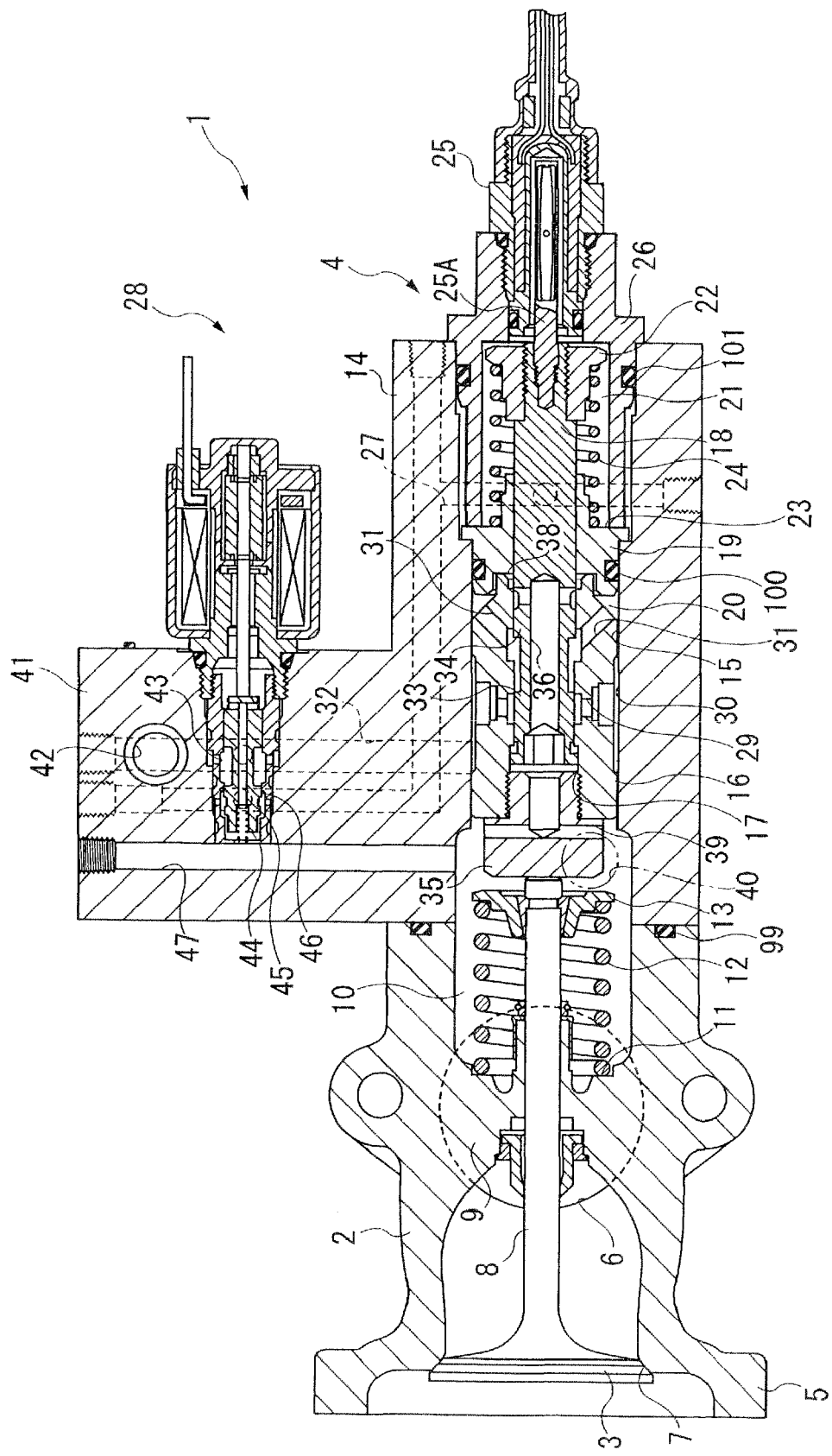
FIG. 2 is a cross sectional view showing the EGR valve device taken along II-II line of FIG. 1 according to the first exemplary embodiment.

FIG. 1 is a perspective view showing an exterior appearance of an EGR valve device 1 in which a poppet valve 3 (valve body) is closed according to the first exemplary embodiment. FIG. 2 is a cross sectional view showing the EGR valve device 1 taken along II-II line of FIG. 1. It should be noted that, in second to sixth exemplary embodiments as described below, the same reference numerals will be used for the components which are the same as those of the first exemplary embodiment, and the detailed description thereof will be simplified or omitted.

As shown in FIG. 1, the EGR valve device 1 is included in an EGR system mounted on a diesel engine provided with a variable geometry turbocharger (not shown). Specifically, the EGR system includes: an EGR pipe for intercommunicating an exhaust manifold and an intake pipe; an EGR cooler mounted on the EGR pipe; the EGR valve device 1 mounted on a lower stream side of the EGR cooler (i.e., closer to an outlet port of the EGR pipe); and a controller for controlling an opening degree of the EGR valve device 1.

While most parts of exhaust gas from the diesel engine are delivered into the variable geometry turbocharger through an exhaust pipe including the exhaust manifold to be discharged, a part of the exhaust gas in the exhaust manifold enters into the EGR pipe to be cooled by the EGR cooler and then returns to the intake pipe after a flow volume of the exhaust gas is adjusted by the EGR valve device 1. The exhaust gas returned to the intake pipe is mixed with charge air passed through an after cooler (i.e., charge air supercharged by the variable geometry turbocharger) and is delivered into engine cylinders through an intake manifold. Incidentally, the flow volume of the returned exhaust gas is adjusted by controlling an opening degree of a valve in the EGR valve device 1 using the controller in accordance with an operation condition of the engine.

Specifically, the EGR valve device 1 includes a valve housing 2 in which the exhaust gas flows. The EGR valve device 1 also includes a circular poppet valve 3 disposed in the valve housing 2 and a hydraulic servo actuator 4 fixed to the valve housing 2 for opening and closing the poppet valve 3. In the EGR valve device 1 of this exemplary embodiment, an EGR rate is higher than that in a conventional EGR valve device. Specifically, the EGR valve device 1 is used at the EGR rate of 15% or more. Accordingly, the poppet valve 3 is larger than a conventional valve. While the EGR rate attained in the conventional EGR valve device is approximately 10 to 13%, a higher EGR rate can be attained in the EGR valve device 1 of this exemplary embodiment. The EGR rate is represented by the following formula.

$$\text{EGR rate} = (\text{amount of recirculated gas})/(\text{amount of exhaust gas in cylinder})$$

The valve housing 2 is provided with an inlet flange 5 bolted to the EGR pipe. By opening the poppet valve 3, exhaust gas entered from the inlet flange 5 (see the outline arrow in FIG. 1) passes through the valve housing 2 to be discharged from an outlet 6 shown in FIG. 2 toward a lower stream side of the EGR pipe (see the black arrow in FIG. 1). A circular valve seat 7 is disposed at the inward side of the inlet flange 5 in the valve housing 2. The inlet flange 5 is closed by contacting the poppet valve 3 with the valve seat 7.

The valve housing 2 is further provided with a partition wall 9 through which a valve stem 8 of the poppet valve 3 penetrates. An oil chamber 10 is provided opposite to the inlet flange 5 relative to the partition wall 9 while a retaining seat 11 is provided on the partition wall 9 lacing the oil chamber 10. The retaining seat 11 is in contact with a first end of a valve spring 12. A retainer 13 is mounted on an end of the valve stem 8 of the poppet valve 3 through wedge action and is in contact with a second end of the valve spring 12. In other words, the poppet valve 3 is biased toward the right side in the figure by the valve spring 12, which is held between the retaining seat 11 and the retainer 13, in a direction where the poppet valve 3 is closed.

The hydraulic servo actuator 4 will be described below.

The hydraulic servo actuator 4 includes a housing 14 having an L-shape in cross section. The housing 14 is mounted on the valve housing 2 via an O-ring 99. A cylinder chamber 15 extending in a direction where the poppet valve 3 is opened and closed is provided within the housing 14. The axis of the cylinder chamber 15 is in alignment with the axis of the poppet valve 3.

A servo piston 16 is disposed within the cylinder chamber 15 of the housing 14 to be slidable in the extending direction of the cylinder chamber 15. The servo piston 16 is provided with a center hole 17 penetrating the servo piston 16 in the sliding direction thereof. A pilot spool 18 is slidably disposed within the center hole 17. The cylinder chamber 15 is divided into a right chamber and a left chamber by a partition 19 pressed to a stepped portion at an intermediate of the cylinder chamber 15. The servo piston 16 and a hydraulic chamber 20 are provided in one of the right and left chambers. A pilot hydraulic chamber 21 is provided in the other chamber. The pilot spool 18 penetrates the partition 19. A base end of the pilot spool 18 is disposed in the pilot hydraulic chamber 21, and a distal end is disposed in the center hole 17 of the servo piston 16.

A retainer 22 is screwed with the base end of the pilot spool 18. The partition 19 is provided with a retaining seat 23. A spring 24 is held between the retainer 22 and the retaining seat 23. The pilot spool 18 is biased by the spring 24 to be spaced away from the poppet valve 3. A movable member 25A of a stroke sensor 25 for detecting a position of the pilot spool 18 is screwed to the base end of the pilot spool 18. A body of the stroke sensor 25 includes a magnet corresponding to the movable member 25A and is fixed to a cover 26 for covering an end of the housing 14.

Incidentally, the cover 26 is adapted to press the partition 19. O-rings 100 and 101 are provided on outer circumferences of the partition 19 and the cover 26, respectively, to seal a gap between their outer circumferences and an inner circumference of the cylinder chamber 15. The O-ring 100 suppresses the movement of pressure oil between the hydraulic chamber 20 and the pilot hydraulic chamber 21 while the O-ring 101 prevents the leakage of the pressure oil from the pilot hydraulic chamber 21 to the outside.

A pilot flow path 27 provided within the housing 14 is communicated with the pilot hydraulic chamber 21. When the pressure oil is supplied into the pilot hydraulic chamber 21 through the pilot flow path 27, the pilot spool 18 is hydraulically moved toward the poppet valve 3. On the contrary, when the pressure oil is removed from the pilot hydraulic chamber 21 through the pilot flow path 27, the pilot spool 18 is returned to its original position by biasing force of the spring 24. A flow direction of the pressure oil can be changed by a proportional pressure control valve 28, and a structure thereof will be described later.

On the other hand, a pair of pressure ports 29 bore the servo piston 16 to radially face each other substantially at the center of the servo piston 16 in the sliding direction thereof. The pressure ports 29 intercommunicate the center hole 17 and the outside. The outer sides of the pressure ports 29 are opened in a shallow groove 30 having a large width consecutively provided on the outer circumference of the servo piston 16 in a circumferential direction. Also, a pair of piston ports 31 bore an end of the servo piston 16 to intercommunicate the center hole 17 and the hydraulic chamber 20.

The housing 14 is provided with a pump flow path 32 communicated with the cylinder chamber 15. The width of the shallow groove 30 and the position where the pump flow path 32 and the cylinder chamber 15 are communicated are set such that the pump flow path 32 is opened in the shallow groove 30 irrespective of the position of the servo piston 16 during a slide stroke. Thus, pressure oil supplied through the pump flow path 32 is constantly delivered into the pressure ports 29. Further, a first spool land 33 and a second spool land 34 are provided, in this order from the side of the poppet valve 3, on the outer circumference of the pilot spool 18 disposed within the center hole 17 to serve as switching means.

When the pressure oil delivered into the pressure ports 29 flows into the piston ports 31 through a groove formed between the first and second spool lands 33 and 34 of the pilot spool 18, the pressure oil flows into the hydraulic chamber 20 from the piston ports 31 to expand the hydraulic chamber 20, whereby the servo piston 16 is moved toward the poppet valve 3. At this time, since the end of the valve stem 8 is in contact with a plug 35 screwed with the servo piston 16, the poppet valve 3 is opened by a lift amount corresponding to a movement amount of the servo piston 16. With such an arrangement, the reactive force applied on the servo piston 16 from the side of the poppet valve 3 (the biasing force of the valve spring 12, the pressure and hydrodynamic force of exhaust gas), is not transmitted to the pilot spool 18.

The servo piston 16 is returned to its original position by removing pressure oil from the hydraulic chamber 20. A return flow path 36 is provided in the pilot spool 18 and is communicated with the outside of the pilot spool 18 at the outer side of the second spool land 34. An opening of the center hole 17 on the end of the servo piston 16 provides a return port 38. Since the hydraulic chamber 20 and the return flow path 36 are communicated with each other via the return port 38, pressure oil flows through the return flow path 36 and then flows into the oil chamber 10 through an outflow path 39 of the plug 35. The pressure oil delivered in the oil chamber 10 is drained from a drain port 40 provided in the housing 14.

Thus, since no pressure is applied within the hydraulic chamber 20, the servo piston 16 is returned to its original position in conjunction with the poppet valve 3 by the biasing force of the valve spring 12. In this exemplary embodiment, a servo-driven three-port servo valve including the servo piston 16 and the pilot spool 18 is provided. The poppet valve 3 is opened and closed by the three-port servo valve. Incidentally, the movements of the poppet valve 3, the servo piston 16 and the pilot spool 18 will be described below with reference to FIG. 3.

The pilot path flow 27 and the pump path flow 32 provided in the housing 14 extend to the pilot hydraulic chamber 21 and the cylinder chamber 15 via a control valve attachment 41 that is integrated with the housing 14. The proportional pressure control valve 28 is attached to the control valve attachment 41. With the integration of the control valve attachment 41 with the housing 14, the proportional pressure control valve 28 is integrated with the hydraulic servo actuator 4. However, the proportional pressure control valve 28 may be separately provided from the hydraulic servo actuator 4 at an independent position.

In the control valve attachment 41, a base end of the pump flow path 32 is communicated with a pump port 42 (in FIG. 2, a part of the pump port 42 is shown in cross section). Pressure oil delivered into the pump port 42 from a boost pump (not shown) passes through the pump flow path 32 to be fed to the pressure port 29 provided on the servo piston 16 within the cylinder chamber 15. On the other hand, apart of the pressure oil delivered from the pump port 42 flows into a spool accommodating portion 43 of the proportional pressure control valve 28, and then flows into the pilot flow path 27 in accordance with a switching operation of the proportional pressure control valve 28. In short, a base end of the pilot flow path 27 is communicated with the spool accommodating portion 43.

A spool 44 included in the proportional pressure control valve 28 is movably accommodated in the spool accommodating portion 43. The spool 44 is moved in accordance with a control signal from the controller. First and second spool lands 45 and 46 are provided on the spool 44. Pressure oil is delivered into a groove provided between the first and second spool lands 45 and 46. Depending on the position of the spool 44, the delivered pressure oil remains in the groove or flows into the pilot flow path 27. FIG. 2 shows the state where the pressure oil remains in the groove. In this state, the spool accommodating portion 43 is communicated with the drain flow path 47 in the housing 14, and pressure oil accumulated in the pilot hydraulic chamber 21 is delivered into the drain flow path 47 from the pilot flow path 27 to be drained from the drain port 40 through the oil chamber 10.

As described above, the pressure oil in the pilot oil hydraulic chamber 21 is removed in the state as shown in FIG. 2, so that the pilot spool 18 is positioned at the rightmost position in the figure by the biasing force of the spring 24. At this time, the servo piston 16 is moved to be in contact with the partition 19, so that most parts of pressure oil in the hydraulic chamber 20 are drained. Accordingly, the hydraulic chamber 20 is minimized. Thus, no oil pressure is applied on the poppet valve 3, whereby the poppet valve 3 is closed by the valve spring 12.

In the EGR valve device 1 as described above, engine oil is used as pressure oil for driving the hydraulic servo actuator 4. A part of the engine oil is supplied to the pump port 42 from an oil pan by the boost pump. Then, the engine oil drained from the drain port 40 is returned to the oil pan through an oil path for returning. The boost pump and the like are mounted on an engine body. Incidentally, when pressure oil in a pipe connected to the hydraulic servo actuator 4 is removed because of a failure of the boost pump or the like, the poppet valve 3 is maintained closed (preferably completely closed) by the biasing force of the valve spring 12.

Next, the operation of the EGR valve device 1, mainly the movement of the hydraulic servo actuator 4, will be described below.

Figure 3:
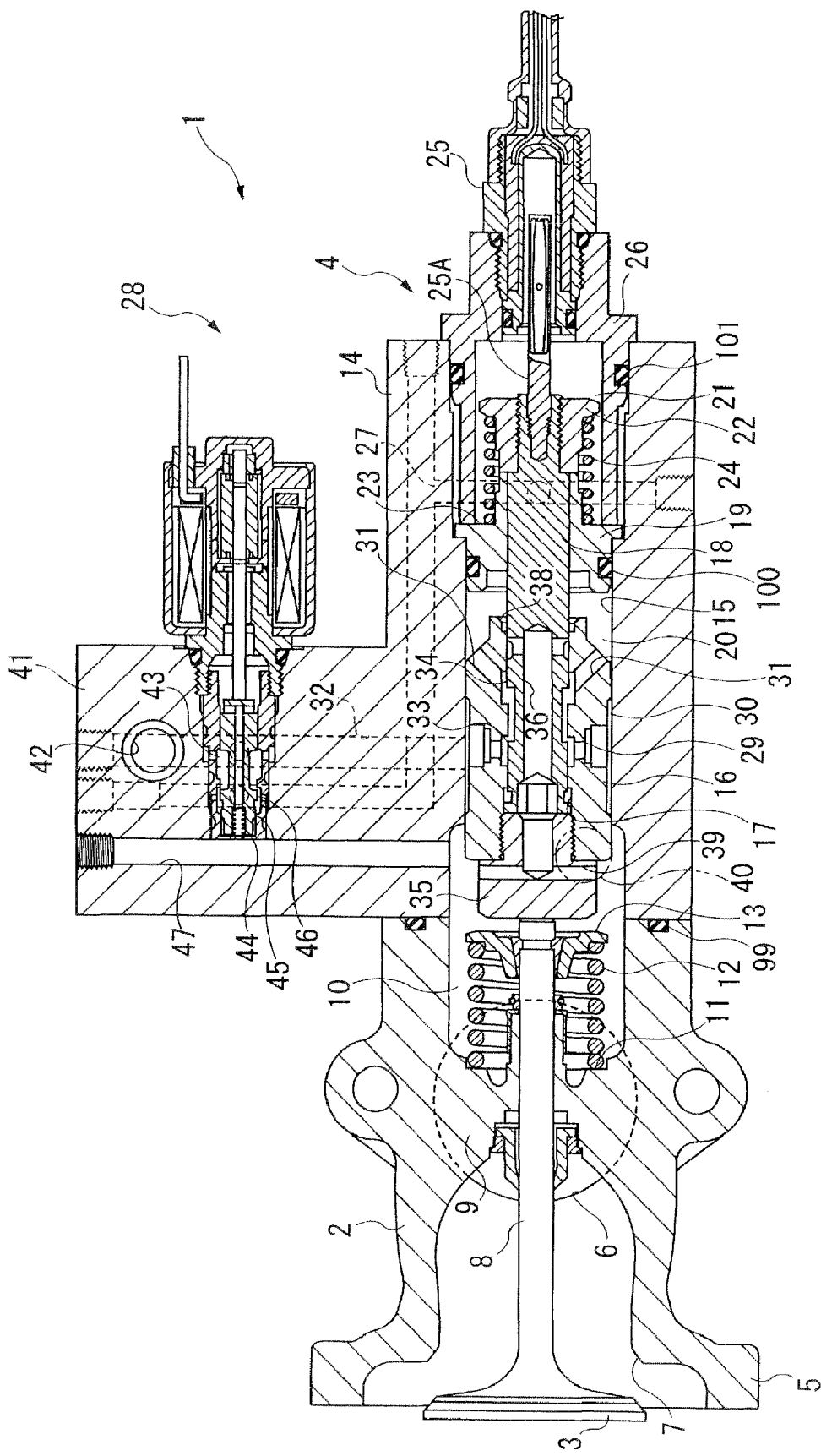
FIG. 3 shows the EGR valve device in which the valve body is opened according to the first exemplary embodiment.

When the poppet valve 3 is opened by a predetermined lift amount from the state shown in FIG. 2, a control signal corresponding to the lift amount is outputted to the proportional pressure control valve 28. As shown in FIG. 3, upon receiving the control signal, the spool 44 is moved to the drain flow path 47 in the proportional pressure control valve 28, so that the groove between the first and second spool lands 45 and 46 is communicated with the pilot flow path 27. Pressure oil in the groove (pressure oil branched from oil that passes through the pump flow path 32) flows through the pilot flow path 27 as pilot pressure oil in order to flow into the pilot hydraulic chamber 21. Thus, the pilot spool 18 is moved toward the poppet valve 3.

In accordance with the movement of the pilot spool 18, the pressure ports 29 and the piston ports 31 of the servo piston 16 are communicated with each other via the groove between the first and second spool lands 33 and 34 provided on the pilot spool 18. Accordingly, pressure oil supplied to the pressure ports 29 is delivered to the piston ports 31 to be further delivered into the hydraulic chamber 20. Thus, the hydraulic chamber 20 is expanded due to the pressure oil delivered therein, so that the poppet valve 3 is opened by the servo piston 16 against the biasing force of the valve spring 12, the pressure and the hydrodynamic force of the exhaust gas applied on the poppet valve 3.

When the servo piston 16 nearly outpaces the pilot spool 18, the pressure ports 29 are closed by the first spool land 33. Accordingly, the supply of the pressure oil to the hydraulic chamber 20 is suspended, whereby the servo piston 16 stops moving and therefore does not outpace the pilot spool 18. Consequently, the servo piston 16 moves to follow the movement of the pilot spool 18, and stops when the pilot spool 18 stops.

Since the servo piston 16 does not outpace the pilot spool 18, high oil pressure can be applied on the servo piston 16 even when a lift amount is maintained so that the poppet valve 3 is not completely opened. The oil pressure of the pressure oil supplied to the pressure ports 29 is much higher than combination force of the biasing force of the valve spring 12 with the pressure and the hydrodynamic force of the exhaust gas.

Accordingly, even when the pressure and hydrodynamic force of the exhaust gas are changed by the exhaust pulse, the servo piston 16 does not wobble due to the change. Therefore, hunting is not caused in the poppet valve 3 even when the poppet valve 3 that is larger than a traditional valve is maintained at a small lift position, so that the flow volume of the exhaust gas can be precisely controlled. Thus, the hydraulic servo actuator 4 can be favorably used not only for completely closing or completely opening the poppet valve 3, but also for maintaining a predetermined opening degree of the poppet valve 3, especially maintaining an opening degree narrowed down by reducing a lift amount.

In addition, since the reactive force applied on the servo piston 16 from the side of the poppet valve 3 is not transmitted to the pilot spool 18 in the hydraulic servo actuator 4 of the exemplary embodiment, a position of the pilot spool 18 can be precisely controlled. Thus, an opening degree of the poppet valve 3 can be accurately controlled by moving the servo piston 16 by an accurate stroke. Incidentally, the position of the pilot spool 18 is monitored by a controller using a detection signal from the stroke sensor 25 to be fed back as a control signal to the proportional pressure control valve 28.

On the other hand, when the poppet valve 3 is closed, the control signal sent to the proportional pressure control valve 28 is turned off to return the spool 44 to its original position, thereby communicating the pilot flow path 27 with the drain flow path 47. Thus, no pressure is applied in the pilot hydraulic chamber 21, so that the pilot spool 18 is returned to its original position by the spring 24. Consequently, the pressure oil in the pilot hydraulic chamber 21 is drained.

When the pilot spool 18 is returned to its original position, the pressure oil in the hydraulic chamber 20 is drained through the return flow path 36 and the oil chamber 10 because the return flow path 36 of the pilot spool 18 and the return port 38 of the servo piston 16 are communicated with each other. Accordingly, no oil pressure is applied in the hydraulic chamber 20, whereby the poppet valve 3 is moved to be closed by the valve spring 12 and the exhaust gas in order to return the servo piston 16 to its original position.

When the servo piston 16 nearly outpaces the pilot spool 18 at this time, the pressure ports 29 and the piston ports 31 are brought into communication with each other, so that the pressure oil is delivered into the hydraulic chamber 20 to move the servo piston 16 in a direction opposite to the returning direction (direction in which the poppet valve 3 is opened). Therefore, the servo piston 16 is prevented from outpacing the pilot spool 18. In addition, as described above, the servo piston 16 is also prevented from moving off from the pilot spool 18 in the opposite direction. Thus, the servo piston 16 is returned to its original position by following the movement of the pilot spool 18, and is stopped when the pilot spool 18 stops.

Further, when the pilot spool 18 is moved to the rightmost side in the figure, the servo piston 16 is in contact with the partition 19 while the hydraulic chamber 20 is not communicated with the return flow path 36, thereby closing the poppet valve 3. Then, a next movement is started to open the poppet valve 3. Incidentally, while the servo piston 16 is in contact with the partition 19, the poppet valve 3 needs to be completely closed. Thus, a slight clearance is preferably provided between the valve stem 8 and the plug 35 of the servo piston 16.

Second Exemplary Embodiment

Figure 4:
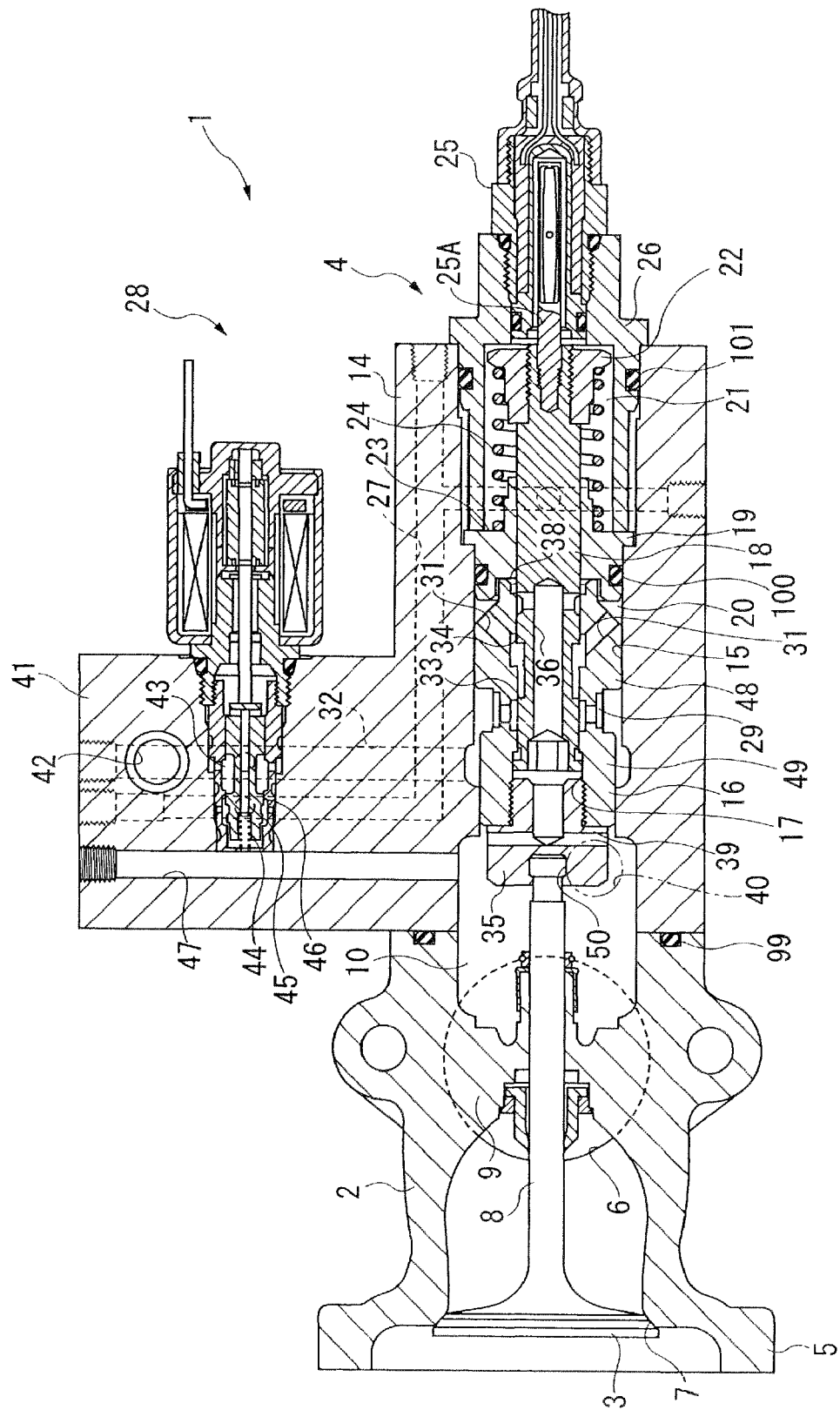
FIG. 4 is a cross sectional view showing a second exemplary embodiment of the invention.

FIG. 4 shows a second exemplary embodiment. This exemplary embodiment is considerably different from the first exemplary embodiment in that a servo piston 16 has a different shape and a valve spring is not used.

The servo piston 16 is divided by the pressure ports 29 into a large-diameter portion 48 close to the hydraulic chamber 20 and a small-diameter portion 49 close to the poppet valve 3. Accordingly, the inner diameter of a portion of the cylinder chamber 15 in which the large-diameter portion 48 slides is different from that of a portion of the cylinder chamber 15 in which the small-diameter portion 49 slides. With such an arrangement, an area for receiving pressure of the pressure oil delivered into the pressure ports 29 in the large-diameter portion 48 is larger than an area for receiving the pressure in the small-diameter portion 49.

Thus, when the pressure oil is removed from the hydraulic chamber 20 and the servo piston 16 is returned to the side close to the hydraulic chamber 20 (when the poppet valve 3 is moved to be closed), the servo piston 16 is returned by a difference in the pressure receiving area at the pressure ports 29. Therefore, it is not necessary that the servo piston 16 is returned by a valve spring.

Since the valve spring is not required as described above, the end of the valve stem 8 of the poppet valve 3 is fitted into a connecting groove 50 of the plug 35. The poppet valve 3 is opened and closed in conjunction with the movement of the servo piston 16.

Third Exemplary Embodiment

Figure 5:
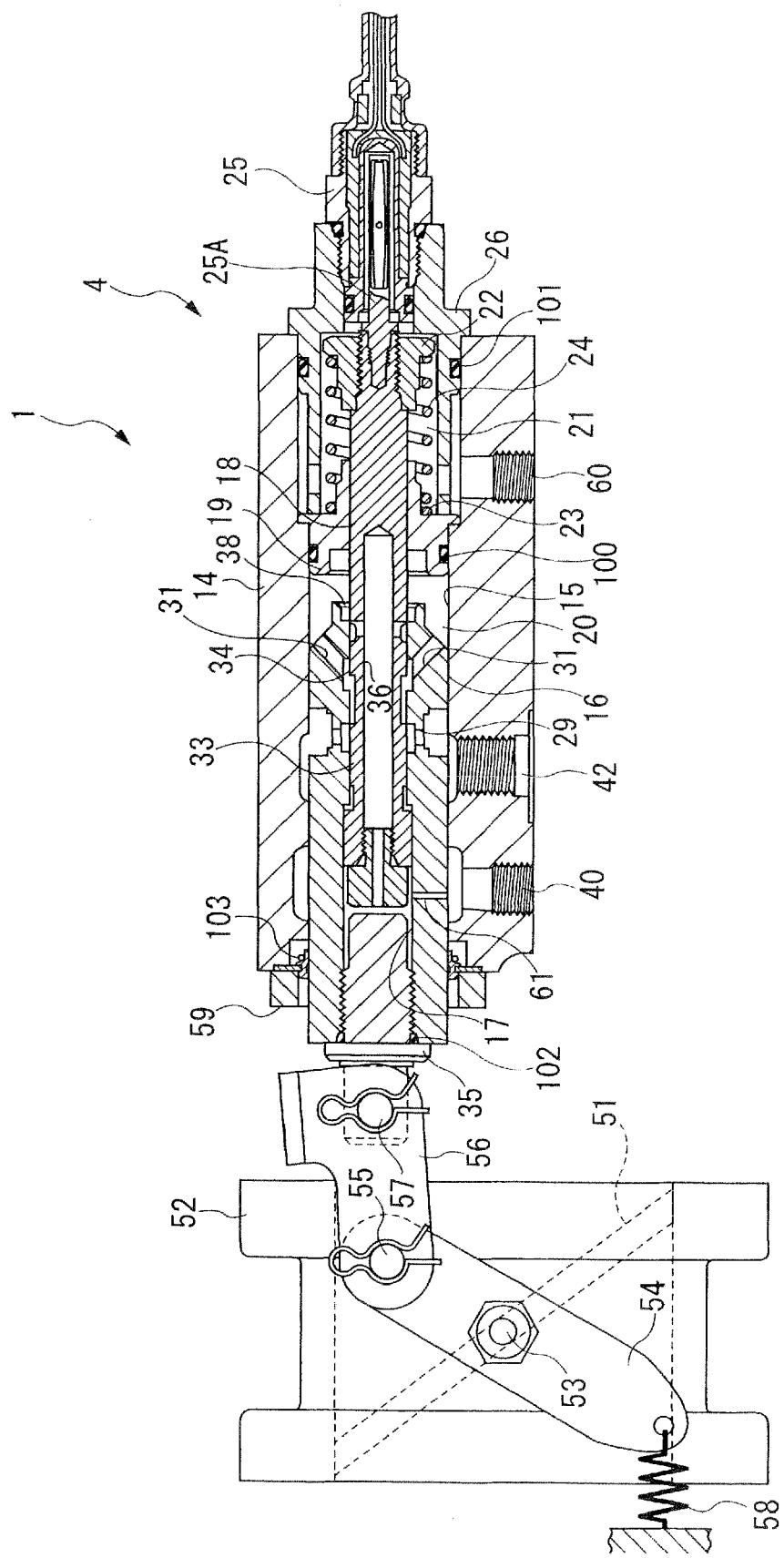
FIG. 5 is a cross sectional view showing a third exemplary embodiment of the invention.

FIG. 5 shows a third exemplary embodiment. One of characteristic features of the third exemplary embodiment is that a butterfly valve 51 is used as a valve body. The butterfly valve 51 is rotatably accommodated in an exhaust gas flow path of a valve housing 52 provided on an EGR pipe. A drive shaft 53 of the butterfly valve 51 projects outwardly from the valve housing 52. An arm 54 extending in a direction orthogonal to the axis of the drive shaft 53 is mounted to an end of the drive shaft 53, so that the arm 54 and the butterfly valve 51 are integrally rotated.

A connecting pin 55 is provided on a first end of the arm 54, between which and a second end thereof a mount with the drive shaft 53 is interposed. A first end of a link member 56 is rotatably coupled to the connecting pin 55. A second end of the link member 56 is rotatably connected to a connecting pin 57 provided on the plug 35 close to the servo piston 16. The second end of the arm 54 is attached to a first end of a spring 58 to bias the servo piston 16 in a direction where the servo piston 16 is returned toward the hydraulic chamber 20, i.e., in a direction where the butterfly valve 51 is closed. A second end of the spring 58 is attached to a fixed member such as a pipe and an engine body.

A portion of the servo piston 16 close to the plug 35 is outwardly exposed. The plug 35 is screwed with the servo piston 16 via an O-ring 102 to seal the center hole 17. Also, an end of the housing 14 close to the plug 35 is closed with a cover 59 via an oil seal 103. The housing 14 is provided with a pilot port 60 and a drain port 40 that is communicated with the cylinder chamber 15. The pilot port 60 is connected to a pilot pipe of a proportional pressure control valve provided at a position spaced away from the housing 14. The drain port 40 is communicated with the center hole 17 via a return port 61 provided on the servo piston 16 to return pressure oil from the center hole 17 to a tank. The housing 14 is mounted to a fixed member such as an engine body via a bracket or the like.

In this exemplary embodiment, the movement of the servo piston 16 is transmitted to the butterfly valve 51 via a link mechanism including the link member 56 and the arm 54 to open and close the butterfly valve 51. At this time, the servo piston 16 is moved to open the butterfly valve 51 by the pump pressure introduced into the pressure ports 29 from the pump port 42. On the contrary, the servo piston 16 is moved to close the butterfly valve 51 mainly by the biasing force of the spring 58.

Fourth Exemplary Embodiment

Figure 6:
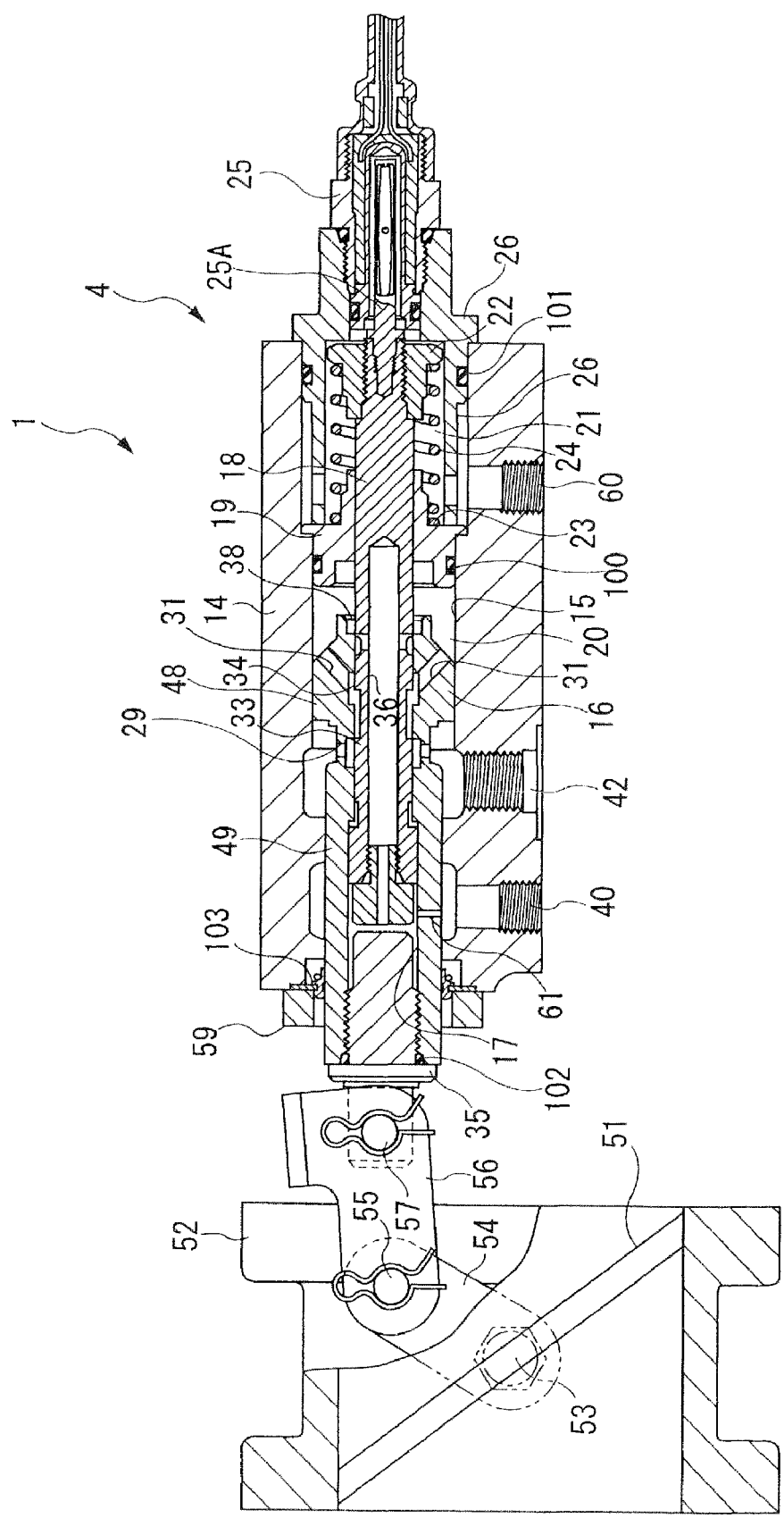
FIG. 6 is a cross sectional view showing a fourth exemplary embodiment of the invention.

In a fourth exemplary embodiment as shown in FIG. 6, the servo piston 16 includes the large-diameter portion 48 and the small-diameter portion 49. Accordingly, the servo piston 16 is returned to its original position by a difference in the pressure receiving areas of the large-diameter portion 48 and the small-diameter portion 49. Thus, the spring of the third exemplary embodiment is not required in the fourth exemplary embodiment. Other arrangements are substantially the same as those of the third exemplary embodiment. For example, the butterfly valve 51 is used as a valve body.

Fifth Exemplary Embodiment

Figure 7:
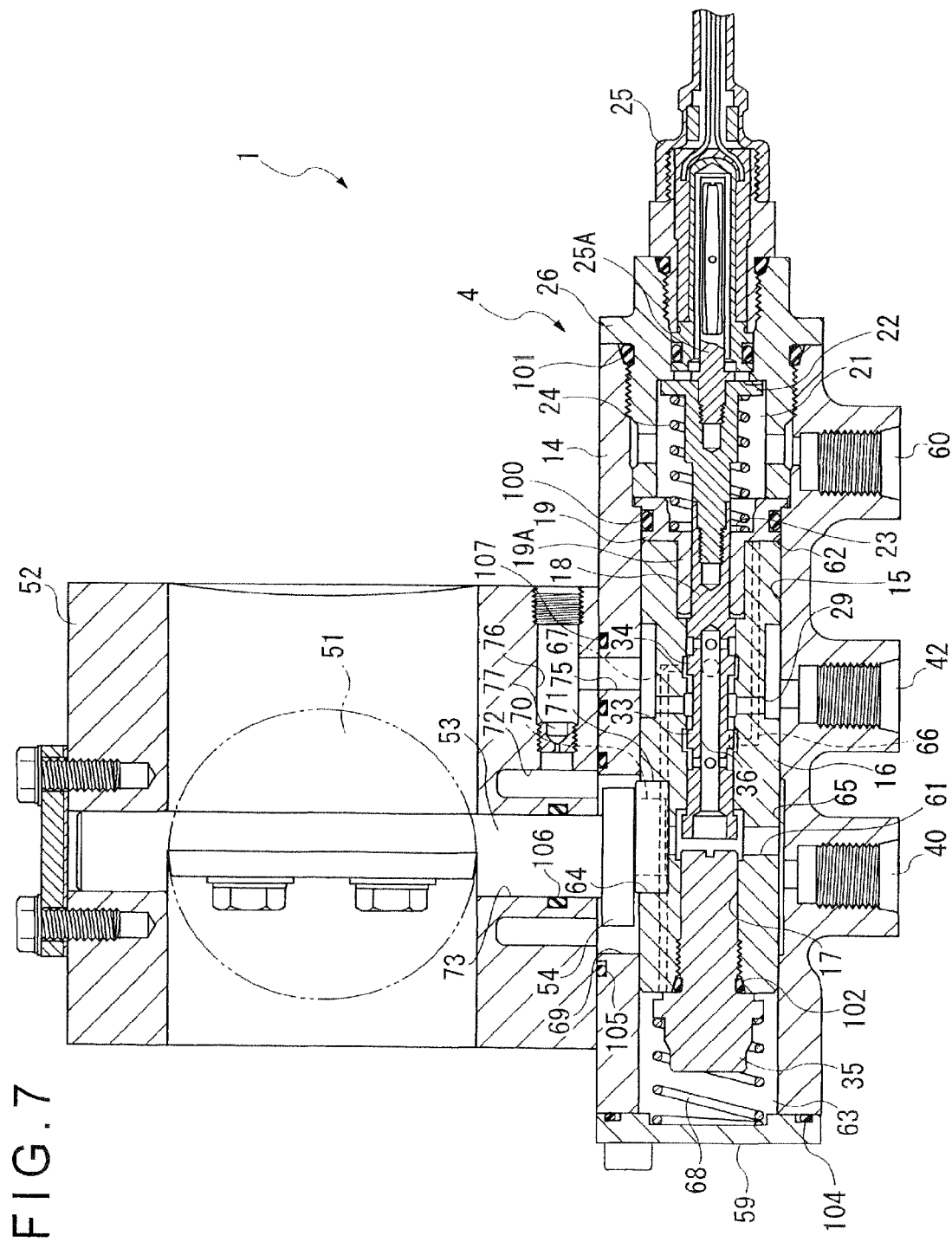
FIG. 7 is a cross sectional view showing a fifth exemplary embodiment of the invention.

FIG. 7 shows a fifth exemplary embodiment. In the fifth exemplary embodiment, the EGR valve device 1 is provided with a servo-driven four-port servo valve. In this EGR valve device 1, the servo piston 16 and the pilot spool 18 have shapes corresponding to the four-port servo valve while a first hydraulic chamber 62 (which is in a minimized state in FIG. 7) and a second hydraulic chamber 63 are respectively formed on both sides of the servo piston 16 within the cylinder chamber 15. As a valve body, the butterfly valve 51 including the drive shaft 53 is used.

When the four-port servo valve is used, the servo piston 16 is also provided with the return port 61 that intercommunicates the center hole 17 and the drain port 40 of the housing 14 to return pressure oil within the center hole 17 to a tank. The outer side of the return port 61 is communicated with the drain port 40 via the shallow groove 65 close to the cylinder chamber 15. The return port 61 and the drain port 40 are constantly communicated with each other during a stroke of the servo piston 16.

As shown in a dotted line in FIG. 7, the servo piston 16 is further provided with: a first piston port 66 that intercommunicates the center hole 17 and the first hydraulic chamber 62 shown at the right side in the figure; and a second piston port 67 that intercommunicates the center hole 17 and the second hydraulic chamber 63 shown at the left side. At this time, an opening of the first piston port 66 close to the center hole 17 is disposed on the left side of the pressure ports 29, and an opening of the second piston port 67 close to the center hole 17 is disposed on the right side of the pressure ports 29. The first and second piston ports 66 and 67 are misaligned in order not to be communicated with the pressure ports 29 and the return port 61.

The end of the servo piston 16 is abuttable to a cover 59 that closes the cylinder chamber 15 of the housing 14 via the plug 35. The position where the end of the servo piston 16 contacts the cover 59 is a position of the maximum stroke of the servo piston 16. The cover 59 is attached to the housing 14 via an O-ring 104. In the second hydraulic chamber 63, a spring 68 is provided between the cover 59 and the plug 35 in order to assist the servo piston 16 to be returned. Even when pressure oil in a pipe connected to the hydraulic servo actuator 4 is lost because of a failure of a boost pump or the like, the butterfly valve 51 is maintained to be closed (preferably completely closed) by the biasing force of the spring 68.

The pilot spool 18 includes the first and second spool lands 33 and 34 substantially at the center. The return flow path 36 having an open end is provided in the pilot spool 18. A groove on the outer side of the first spool land 33 is communicated with the return flow path 36. Similarly, a groove on the outer side of the second spool land 34 is communicated with the return flow path 36. Further, since one end of the return flow path 36 is opened, the return flow path 36, return port 61, and drain port 40 are communicated with each other.

Also, in the hydraulic servo actuator 4 as described above, the servo piston 16 is moved to follow the movement of the pilot spool 18 when the pilot spool 18 is moved. At this time, the pilot spool 18 only axially slides in the servo piston 16. Thus, the reactive force from the side of the butterfly valve 51 is not applied on the pilot spool 18 at all.

The movement of the hydraulic servo actuator 4 will be described. In FIG. 7, no pressure oil is supplied to the pilot hydraulic chamber 21, and the pilot spool 18 and the servo piston 16 are located most closely to their original positions. At this time, the end of the servo piston 16 is in contact with the partition 19. At this position, the first spool land 33 of the pilot spool 18 is misaligned toward the right side of the first piston port 66 of the servo piston 16. Thus, the first hydraulic chamber 62 is communicated with the return port 61 through the return flow path 36 to drain all of pressure oil in the first hydraulic chamber 62.

On the other hand, the second spool land 34 is misaligned toward the right side of the second piston port 67, whereby the pressure ports 29 and the second piston port 67 are communicated with each other. Thus, pressure oil is supplied to the second hydraulic chamber 63 through the pressure ports 29 and the second piston port 67.

When pilot pressure is raised to a predetermined level from the above-described state by supplying the pressure oil to the pilot hydraulic chamber 21, the pilot spool 18 is moved to a position where the pilot pressure is balanced with the spring 24. Since the first spool land 33 is misaligned toward the left side of the first piston port 66 at this time, the first piston port 66 and the pressure ports 29 are communicated with each other to supply the pressure oil to the first hydraulic chamber 62.

At the same time, the second spool land 34 is misaligned toward the left side of the second piston port 67. Thus, the second piston port 67 and the return flow path 36 are communicated with each other to drain the pressure oil in the second hydraulic chamber 63, whereby the servo piston 16 is moved while following the movement of the pilot spool 18. The movement of the servo piston 16 is stopped when the first and second piston ports 66 and 67 are closed by the first and second spool lands 33 and 34. The servo piston 16 stops at a position corresponding to a position where the pilot spool 18 stops. Incidentally, the servo piston 16 does not outpace the pilot spool 18.

A part of the pressure oil supplied to the pilot hydraulic chamber 21 passes through a slight clearance provided between a cylinder 19A of the partition 19 and the retainer 22 and a slight clearance provided between the cylinder 19A and an outer circumference at a right end of the pilot spool 18 in order to enter into an area defined at the left side, i.e., an area partitioned by an inner circumference of the center hole 17 of the servo piston 16, an outer circumference of the pilot spool 18, and a distal end of the cylinder 19A.

Subsequently, the pilot pressure is removed in order to return the servo piston 16 to its original position, whereby the first piston port 66 is communicated with the return flow path 36 again to drain the pressure oil in the first hydraulic chamber 62 and move the servo piston 16 to its original position. The movement of the servo piston 16 is also stopped when the first and second piston ports 66 and 67 are closed by the first and second spool lands 33 and 34. The servo piston 16 stops at a position corresponding to a position where the pilot spool 18 stops, and does not outpace the pilot spool 18 in returning to the original position.

However, when no pilot pressure is applied at all, the servo piston 16 is eventually moved to contact with the partition 19 as shown in FIG. 7. The positional relationship of the first and second spool lands 33 and 34 and the first and second piston ports 66 and 67 is as described above.

Figure 8:
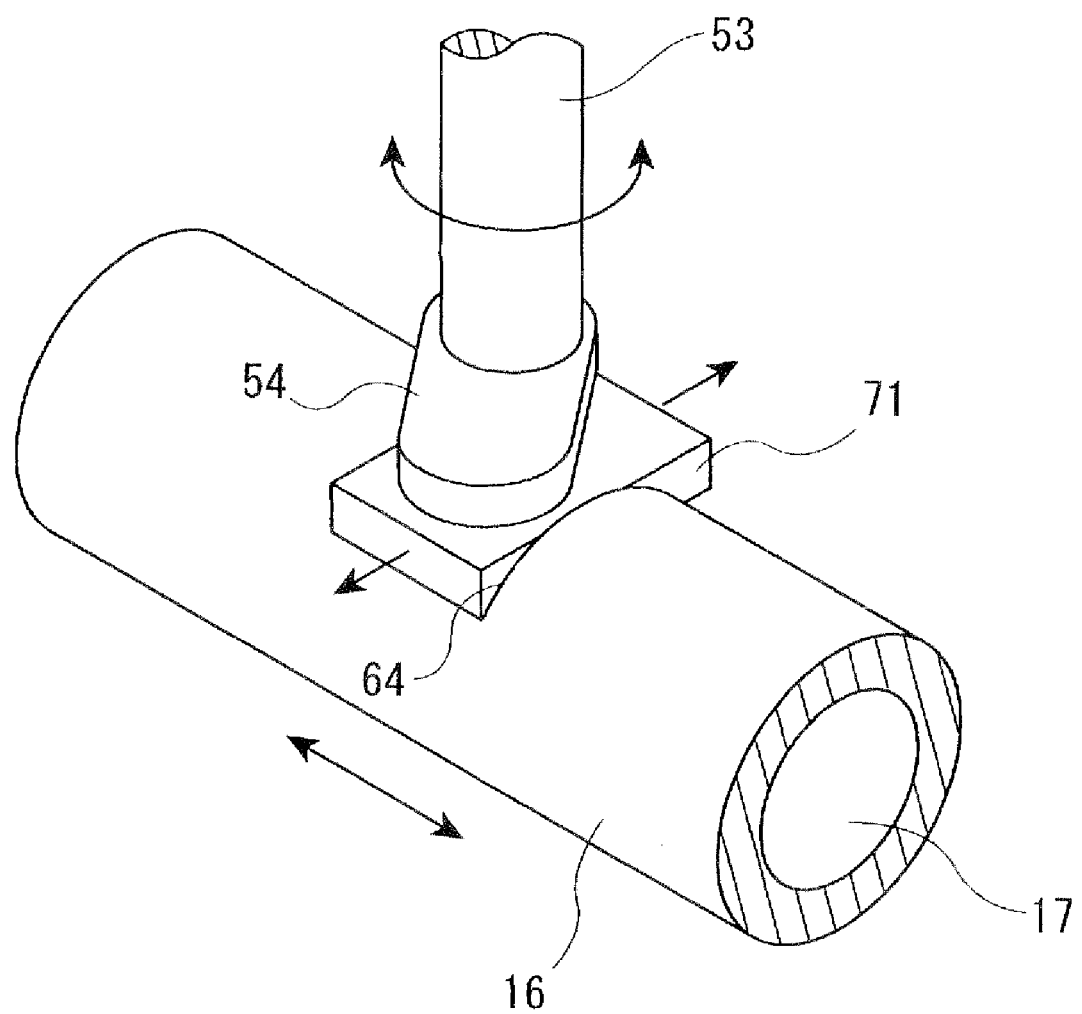
FIG. 8 is a perspective view showing a primary portion of the fifth exemplary embodiment.

In this exemplary embodiment, the housing 14 of the hydraulic servo actuator 4 is fixed to a valve housing 52. The housing 14 is provided with an opening 69 at a position corresponding to a range of the movement of the groove 64 of the servo piston 16. The drive shaft 53 projecting from the valve housing 52 is disposed at the opening 69. The arm 54 is provided on the end of the drive shall 53 as shown in FIG. 8.

The arm 54 is provided with a connecting pin 70 projecting toward the groove 64. A slider 71 is engaged with the connecting pin 70 to be slidably fitted into the groove 64. With such an arrangement, when the servo piston 16 is moved, the slider 71 is moved in accordance with the movement of the servo piston 16 to slide along the groove 64. The movement of the slider 71 and the rotation of the connecting pin 70 allow the circle movement of the arm 54 and the rotation of the drive shall 53, thereby opening and closing the butterfly valve 51.

An inflow section 72 is provided on the side of the valve housing 52 which contacts with the housing 14. The inflow section 72 is shaped in a circular deep groove surrounding the drive shaft 53 to correspond to the opening 69. The inflow section 72 is communicated with the return port 61 of the servo piston 16 via the shallow groove 65 and the opening 69. Accordingly, pressure oil delivered from the return port 61 is initially accumulated in the opening 69 and the inflow section 72 through the shallow groove 65, thereby cooling the vicinity of the drive shaft 53, a sliding portion of the slider 71 in the groove 64, and a connecting portion of the connecting pin 70 and the slider 71.

At this time, an O-ring 105 is held between the housing 14 and the valve housing 52 to cover the surrounding of the inflow section 72. An O-ring 106 is held between the drive shaft 53 and the inner circumference of the through hole 73. Thus, the pressure oil is prevented from leaking into the outside or the exhaust gas.

In addition, for cooling the vicinity of the drive shaft 53, the housings 14 and 52 are provided with leading flow paths 75 and 76, respectively, in order to draw a part of the pressure oil delivered into the pressure port 29 into the inflow section 72. A orifice 77 is provided in the leading flow path 76 of the valve housing 52, so that the drawn pressure oil can be injected toward the through hole 73. The temperature of the O-ring 106 can be maintained to be lower than a heatproof temperature by cooling the vicinity of the drive shaft 53. Sealing characteristics of an inserting portion of the drive shaft 53 can be also favorably maintained. An O-ring 107 prevents the pressure oil from leaking from the leading flow paths 75 and 76 between the housing 14 and 52.

Such an injecting mechanism is also provided in the EGR valve device 1 of the above-described first and second exemplary embodiments even though the explanation and illustration thereof are omitted. With such an injecting mechanism, the sliding portion of the valve stem 8 or a guide into which the valve stem 8 is inserted is cooled by injecting pressure oil into the oil chamber 10.

Sixth Exemplary Embodiment

Figure 9:
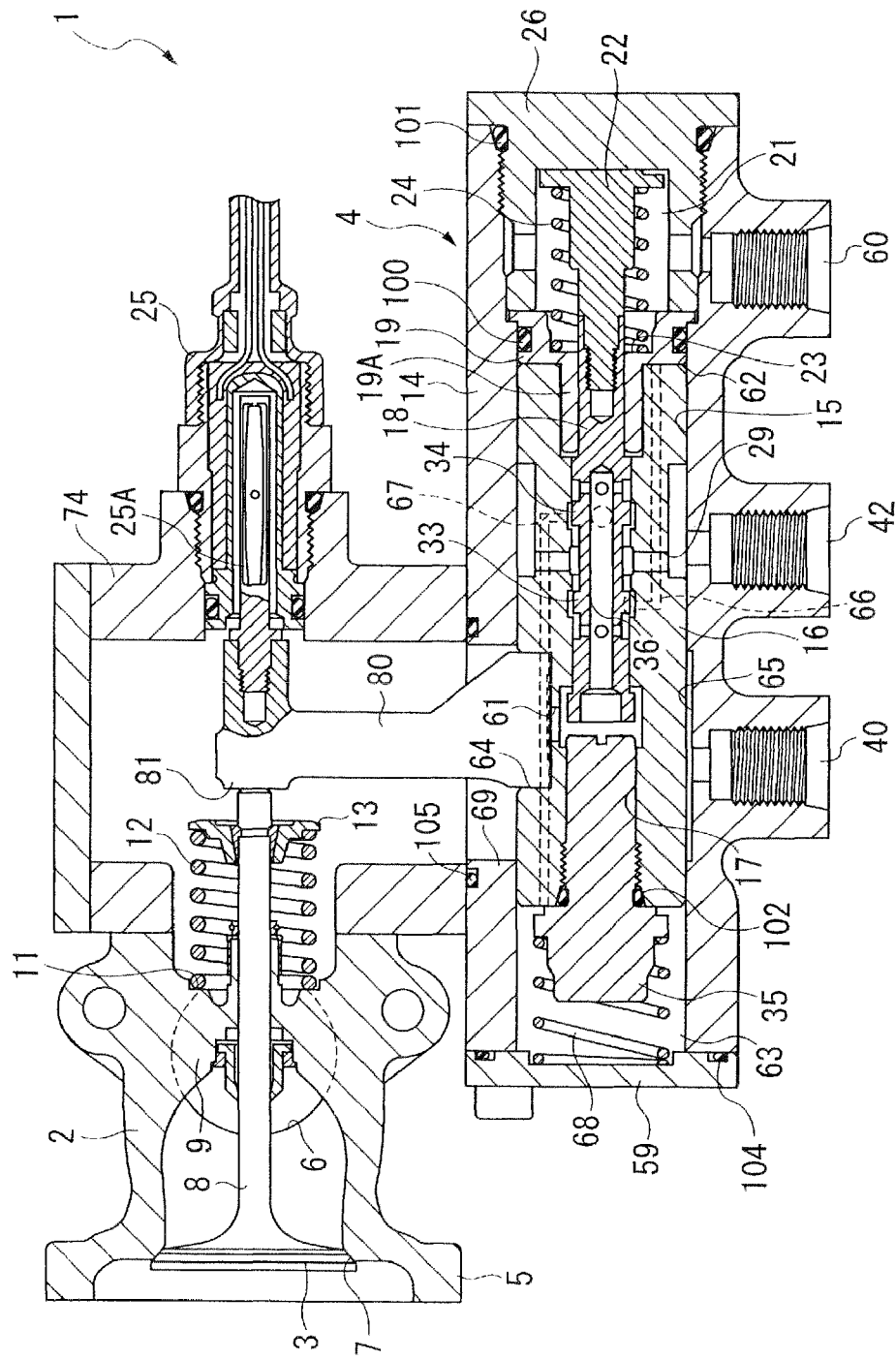
FIG. 9 is a cross sectional view showing a sixth exemplary embodiment of the invention.

FIG. 9 shows a combination of the poppet valve 3 and the hydraulic servo actuator 4 using a four-port servo valve. In the sixth exemplary embodiment, the valve housing 2 is fixed to an intermediate housing 74, and the housing 14 of the hydraulic servo actuator 4 is fixed to the intermediate housing 74. An arm 80 is fixed to the groove 64 of the servo piston 16 to press the poppet valve 3 by a press portion 81 provided on a distal end of the arm 80.

Since the movable member 25A of the stroke sensor 25 is screwed to the opposite side of the press portion 81, a lift amount of the poppet valve 3 can be directly detected by the stroke sensor 25 located coaxially with the movable member 25A, not via the pilot spool 18. Incidentally, the valve stem 8 may be fitted into the distal end of the arm 80 to be held. At this time, the poppet valve 3 is moved in conjunction with the distal end of the arm, whereby the valve spring 12 is not required.

Although the best arrangement, method, and the like for carrying out the invention have been described above, the scope of the invention is not limited thereto. In other words, although particular embodiments of the invention are mainly illustrated and described, a variety of modifications may be made by those skilled in the art on shapes, amounts, and other detailed arrangements of the embodiments as described above without departing from the spirit and object of the invention.

Accordingly, the above description limiting shapes, amounts and the like is exemplary description for facilitating understanding of the invention and does not limit the scope of the invention, so that description with names of members without all of or a part of the limitations on shapes or amounts are included in the scope of the invention.

For example, although a lift amount of the poppet valve 3 can be directly detected by the stroke sensor 25 in the sixth exemplary embodiment, a drive shaft may be directly detected by an angle sensor or the like when a butterfly valve is used as a valve body.

Although the stroke sensor 25 detects a lift amount of the poppet valve 3 in the exemplary embodiments, the EGR valve device according to the aspect of the invention may not include the stroke sensor. Without the stroke sensor, a lift amount of the poppet valve 3 can be adjusted by a control signal of a controller, thereby controlling a flow volume of exhaust gas while maintaining a small opening degree of a valve body.

In the above exemplary embodiments, the EGR valve device 1 is provided closer to the outlet port of the EGR pipe to be used for controlling a flow volume of exhaust gas when a part of the exhaust gas is returned to the intake pipe. However, when a bypass passage for bypassing an EGR cooler is provided on the EGR pipe, the EGR valve according to the aspect of the invention may be used for switching between the passage for delivering exhaust gas therethrough and a passage to the EGR cooler.

The invention claimed is:

1. An EGR valve device, comprising:
a valve housing through which exhaust gas passes;
a valve body accommodated in the valve housing; and
a hydraulic servo actuator that drives the valve body to be opened and closed,
wherein the hydraulic servo actuator includes:
a housing;
a servo piston slidably accommodated in the housing; and
a pilot spool accommodated in a center hole of the servo piston to slide by a pilot pressure,
wherein the hydraulic servo actuator is structured so that a reactive force applied on the servo piston from a side of the valve body is not transmitted to the pilot spool, and
wherein the valve body is driven to be opened and closed in conjunction with a movement of the servo piston.

2. The EGR valve device according to claim 1,
wherein a hydraulic chamber into which pressure oil is delivered is provided on one end of the servo piston in the housing, and
wherein the servo piston comprises:
a pressure port for delivering the pressure oil from the outside into the center hole;
a piston port for intercommunicating the center hole and the hydraulic chamber; and
a return port for discharging the pressure oil in the hydraulic chamber to the outside,
wherein the pilot spool comprises switching means for switching a communication state of the respective ports.

3. The EGR valve device according to claim 2, wherein the servo piston includes a large-diameter portion and a small-diameter portion on which oil pressure in the pressure port are applied and moves toward the one end of the servo piston by a difference between pressure receiving areas of the large-diameter portion and the small-diameter portion.

4. The EGR valve device according to claim 1,
wherein a first hydraulic chamber and a second hydraulic chamber into which pressure oil is delivered are provided at the one end and the other end of the servo piston, respectively, and
wherein the servo piston comprises:
a pressure port for delivering the pressure oil from the outside into the center hole;
a first piston port for intercommunicating the center hole and the first hydraulic chamber;

a second piston port for intercommunicating the center hole and the second hydraulic chamber; and a return port for discharging the pressure oil in the hydraulic chamber to the outside, individually, wherein the pilot spool comprises switching means for switching a communicating state of the respective ports.

5. The EGR valve device according to claim 1, wherein the valve body is one of a poppet valve and a butterfly valve.

6. The EGR valve device according to claim 1, wherein the valve body is a butterfly valve, and the valve housing is provided with an inflow section into which a cooling medium is delivered.

7. The EGR valve device according to claim 6, wherein the cooling medium is oil used in the hydraulic servo device.

8. The EGR valve device according to claim 1, wherein the EGR valve device is adapted to be used at an EGR rate of at least 15%.

9. The EGR valve device according to claim 2, further comprising a spring that is provided between the pilot spool and the housing, and which biases the pilot spool toward a direction in which the pilot spool slides by the pilot pressure.

10. The EGR valve device according to claim 4, wherein a spring that biases the pilot spool toward a direction where the pilot spool slides by the pilot pressure is provided between the pilot spool and the housing.

* * * * *